Patented Jan. 8, 1929.

1,698,369

UNITED STATES PATENT OFFICE.

WALTER G. KOUPAL, OF TARENTUM, PENNSYLVANIA, AND JOSEPH S. GREGORIUS, OF MOUNT VERNON, OHIO, ASSIGNORS TO PITTSBURGH PLATE GLASS COMPANY, A CORPORATION OF PENNSYLVANIA.

METHOD OF REGULATING GLASS TEMPERATURES IN DRAWING TANKS.

Application filed December 19, 1927. Serial No. 241,016.

Figure 2:
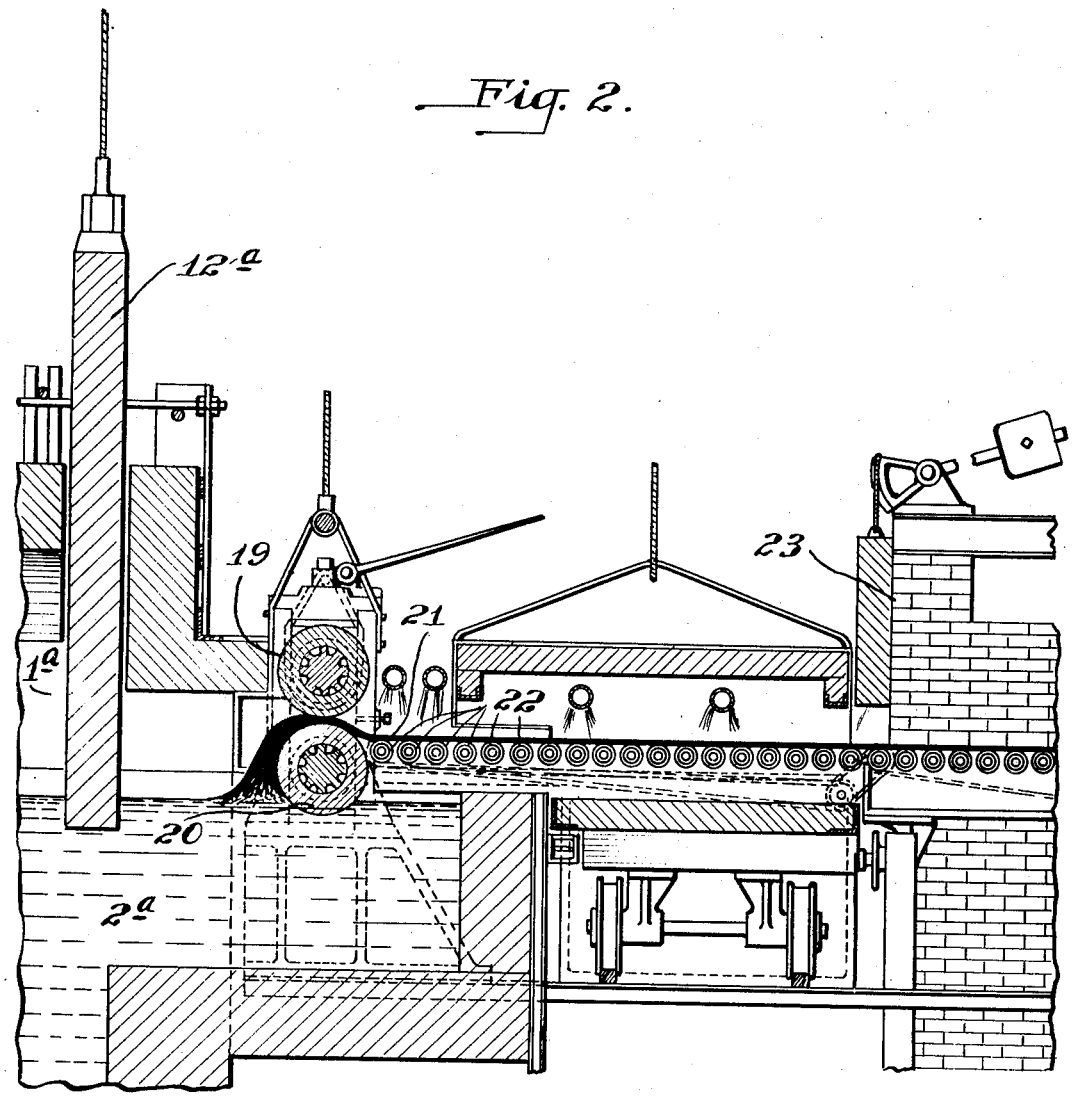

The invention relates to the regulation of the temperatures existing in different parts of a drawing tank or forehearth, from which a sheet of glass is withdrawn continuously. In order to define the line of generation of the glass sheet and secure a reduction of temperature in the body of glass from which the sheet is generated, a draw bar of clay is employed extending transversely of the tank, below the line of generation of the sheet. Difficulty is often experienced in maintaining the same temperatures in the glass on the opposite sides of this bar, and it has been found that this condition of unequal temperatures promotes warping and breakage in the glass sheet. One means of controlling this condition is the use of gas burners in the forehearth on opposite sides of the draw bar which may be regulated to meet requirements, but this method has not given the uniformity of temperature control desired, and the present invention is designed to overcome the difficulty and give a very close regulation without the use of burners, although such burners may be used, if desired in conjunction with the method comprising the present invention. The invention is also of value in other sheet forming operations in which the glass is withdrawn from a forehearth by the use of rolls. One form of apparatus with which the invention may be carried out is shown in the accompanying drawings, wherein:

The figure is a vertical longitudinal section through one form of the apparatus with the parts in position of use. And Fig. 2 is a similar section through a modification.

Referring to the drawings, 1 is the end of the melting tank, preferably of the regenerator type, and 2 is the forehearth or drawing tank, preferably of the same depth as the melting tank, so that a relatively large deep body of glass is provided in which the sheet is drawn. Extending transversely of the forehearth from one side to the other is a pair of blocks 3, 3, preferably L-shaped in cross section, and spaced apart so as to provide a drawing opening 4. A glass ribbon or sheet 5 may be drawn upward by any desired form of apparatus. As shown, it comprises a casing 6 having pairs of opposing rolls 7, 7 for gripping the opposite sides of the sheet and drawing it upward. This casing extends upward a distance of 15 or 20 feet and is divided into compartments of gradually decreasing temperature so that the sheet is annealed and cooled as it travels therethrough, being cut off at the top in sections as it emerges. The space 8 above the bath through which the sheet is drawn, is preferably closed off from the atmosphere by means of the inclined plates 9, 9 and by other plates located at the ends of the space 8. The draw bar 10 of clay or other suitable refractory material, is located transversely of the glass bath beneath the line of generation of the sheet in order to fix the position of the line of generation and in order to give a cooler body of glass from which to draw than would be the case if no draw bar were used. A bar 11 is also preferably employed a little to the rear of the transverse block 3, which bar extends across the furnace and acts as a skimming device to prevent impurities at the surface of the glass from being carried along and drawn into the sheet.

The gate 12 projects down into the glass, as shown, and is supported from above by means of chains 13 passing over pulleys and suitable counterweights, so that the gate may be positioned vertically at any desired point and will maintain itself in such position. This gate when used in accordance with our invention serves as a means for regulating the relative temperatures of the bodies of glass at A and B on opposite sides of the draw bar 10. As heretofore stated, if the glass on one side is hotter than on the other, strain is introduced into the sheet which is produced and an undue amount of warping and breakage occurs, so that it becomes very important to maintain these temperatures substantially the same. If the temperature at B should become less than at A, the desired regulation of temperature is secured by lowering the gate 12 a slight distance farther into the glass. There is a constant flow of glass from the tank 1 to the tank 2, due to the withdrawal of the body of glass which makes up the sheet 5, and when the gate 12 is lowered, the hot glass from the tank 1 flows farther into the forehearth 2 than would otherwise be the case, so that the glass at B in the right hand end of the forehearth is raised in temperature. The diversion of this hot glass to the far end of the forehearth not only tends to increase the temperature at this end, but tends to correspondingly decrease the temperature at A on the near side of the draw bar, since under these conditions, less glass flows to this side of the bar. On the other hand, if the temperature of the glass at A becomes less than that at B, the gate 12 is raised slightly, so that more of the hot glass flows to this side of the draw bar instead of flowing to the far side, thus tending to increase the temperature at A and decrease it at B. By carefully adjusting the gate, it is possible to maintain the temperatures at A and B substantially the same under all conditions.

During the drawing operation, the roof members 14, 14 which are suspended from above by means of the chains 15, are maintained in the position shown, so that the burner openings 17 and 18 are blanked, the gate 12 being relied upon entirely to regulate the temperature in the forehearth. When it becomes necessary to re-condition the glass in the forehearth 2, and the drawing of the sheet is interrupted, the roof members 14, 14 are raised so as to uncover the burner openings and the glass is reheated by means of the burners which project through the burner openings.

Figure 1:
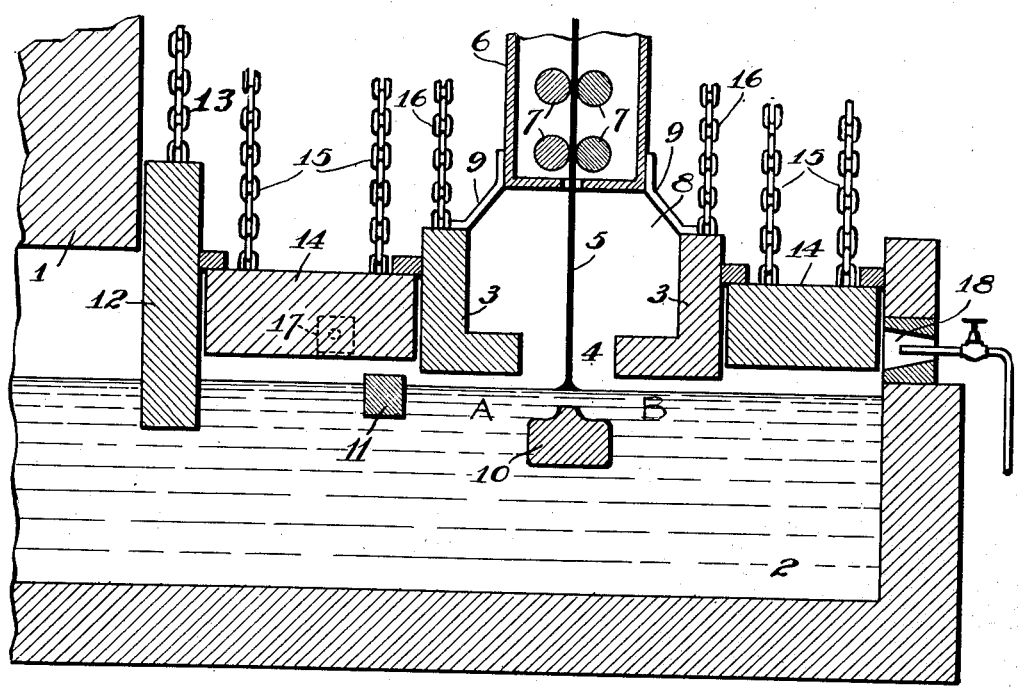

The invention is shown as applied to a sheet forming operation, in which the sheet is produced by a drawing operation, and in which a draw bar is employed beneath the line of generation of the sheet, but it will be understood that the invention is not limited in these particulars, and that it may be used in operations in which the glass sheet is removed or generated from the glass by some method other than drawing, such for instance as by rolling, where no draw bar is employed, such as in the Gelstharp Patents Nos. 1,615,834 and 1,580,130, and in other operations where the draw bar is dispensed with. This type of apparatus, which involves rolling rather than drawing is shown in Fig. 2, in which 1ª is the melting tank and 2ª the forehearth, the gate 12ª here performing the function of the gate 12 of Fig. 1. The glass sheet is generated by means of the rolls 19 and 20 which are suitably driven and water cooled, the glass sheet 21 passing laterally over the runway 22 and into the leer 23. To increase the temperature of the glass on the side of the roll 20 remote from the melting tank, it is only necessary to lower the gate 12ª, while a raising of such gate so that it is immersed to a less depth in the bath, results in a decrease in the temperature of the glass on such side of the roll remote from the melting tank.

What we claim is:

1. The method of regulating the temperatures on opposite sides of the draw bar in a glass drawing tank communicating with a melting tank and provided with a gate between the tanks projecting down into the glass, which consists in lowering the gate farther into the glass to secure an increase in the temperature of the glass on the far side of the bar and a decrease in the temperature of the glass on the near side of such bar, and in raising the gate (but still keeping it in the glass) to secure a decrease in the temperature of the glass on the far side of the bar and an increase in the temperature of the glass on the near side of the bar.

2. The method of regulating the temperatures on opposite sides of a glass sheet being generated in a glass drawing tank or extension communicating with a melting tank and provided with a gate between the tanks projecting down into the glass, which consists in lowering the gate further into the glass to secure an increase in the temperature of the glass on the side of said line of generation remote from the melting tank, and a decrease in the temperature of the glass on the side of said line next to the melting tank, and in raising the gate (but still keeping it in the glass) to secure a decrease in the temperature of the glass on the side of said line remote from the melting tank and an increase in the temperature of the glass on the side of said line next to the melting tank.

In testimony whereof, we have hereunto subscribed our names.

WALTER G. KOUPAL.
J. S. GREGORIUS.